United States Patent [19]
Interrante et al.

[11] Patent Number: 6,011,783
[45] Date of Patent: Jan. 4, 2000

[54] METHOD AND APPARATUS FOR MONITORING ECHO CANCELLATION PERFORMANCE WITHIN A TELEPHONE COMMUNICATIONS NETWORK

[75] Inventors: John Alexander Interrante, Richardson; Tomas Perez Morales, Lewisville, both of Tex.

[73] Assignee: Nortel Networks Corporation, Montreal, Canada

[21] Appl. No.: 08/873,012

[22] Filed: Jun. 11, 1997

[51] Int. Cl.[7] ................................ H04B 3/20; H04M 1/00
[52] U.S. Cl. .......................... 370/286; 370/201; 279/410
[58] Field of Search .................................. 370/201, 286, 370/287, 288, 289; 379/410, 409, 406

[56] References Cited

U.S. PATENT DOCUMENTS

| | | | |
|---|---|---|---|
| 4,507,747 | 3/1985 | Houdard et al. | 364/724 |
| 4,549,049 | 10/1985 | Guidoux | 179/175.31 |
| 5,008,923 | 4/1991 | Kitamura et al. | 379/3 |
| 5,274,705 | 12/1993 | Younce et al. | 379/410 |
| 5,373,509 | 12/1994 | Katsura | 371/21.2 |
| 5,528,687 | 6/1996 | Tanaka et al. | 379/406 |
| 5,775,246 | 2/1999 | Houghton | 379/406 |

*Primary Examiner*—Ajit Patel
*Assistant Examiner*—Brian Nguyen
*Attorney, Agent, or Firm*—John D. Crane; Antony P. Ng; Andrew J. Dillon

[57] ABSTRACT

A method and apparatus for monitoring the performance of an echo canceler within a telephone communications network is disclosed. In accordance with the method and apparatus of the present invention, an embedded echo-cancellation performance monitoring circuit comprises three separate units, namely, a test data injection unit, an echo path simulator unit, and a test data extraction unit. The test data injection unit is utilized to inject test data into a serial data stream intended for an echo canceler. The echo path simulator unit is utilized to simulate an echo path by attenuating the test data in the serial data stream and to loop the test data in the serial data stream back to the echo canceler. The test data extraction unit is utilized to extract the test data from a send-out data stream exiting from the echo canceler.

10 Claims, 4 Drawing Sheets

METHOD AND APPARATUS FOR MONITORING ECHO CANCELLATION PERFORMANCE WITHIN A TELEPHONE COMMUNICATIONS NETWORK

BACKGROUND OF THE INVENTION

1. Technical Field

The present invention relates to a method and apparatus for improving interexchange digital telephony in general and, in particular, to a method and apparatus for improving a telephone communications network having echo cancelers. Still more particularly, the present invention relates to a method and apparatus for measuring the performance of an echo canceler within a telephone communications network.

2. Description of the Related Art

A digital telephone communications network typically includes a transmitter and a receiver. The function of the transmitter is to put a series of signal pulses, usually shaped by some form of filters, onto the network. The function of the receiver is to detect the signal pulses as they are being sent from the far end of the network. Sometimes, the detection task is difficult because the signal pulses are being distorted during transmission. One source of distortion is caused by the coupling of the transmit signal pulses directly across a hybrid circuit and into the receiver input as "echoes." This is a common problem when operating on a two-wire system.

Generally, such transmit signal pulse echoes may be removed by an echo canceler. An adaptive filter is typically utilized to derive a function of the transmit signal for subsequent subtraction from the received signal. Although the transmission quality will be improved with the addition of an echo canceler, currently there is a lack of convenient techniques for monitoring the performance of these echo cancelers within the telephone communications network. Under the prior art, several pieces of test equipment are required to be connected externally from the telephone communications network in order to perform such echo-cancellation performance monitoring. Consequently, it would be desirable to provide an improved method and apparatus for measuring the performance of an echo canceler within a telephone communications network such that the need for external test equipment may be reduced or eliminated.

SUMMARY OF THE INVENTION

In view of the foregoing, it is therefore an object of the present invention to provide a method and apparatus for improving an interexchange digital telephone system.

It is another object of the present invention to provide a method and apparatus for improving a telephone communications network having echo cancelers.

It is yet another object of the present invention to provide an improved method and apparatus for measuring the performance of an echo canceler within a telephone communications network.

In accordance with the method and apparatus of the present invention, an embedded echo-cancellation performance monitoring circuit is provided which comprises three separate units, namely, a test data injection unit, an echo path simulator unit, and a test data extraction unit. The test data injection unit is utilized to inject test data into a serial data stream intended for an echo canceler. The echo path simulator unit is utilized to simulate an echo path by attenuating the test data in the serial data stream and to loop the test data in the serial data stream back to the echo canceler. The test data extraction unit is then utilized to extract the test data from a send-out data stream exiting from the echo canceler.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention may be implemented in any telephone communications network having an echo canceler. As will be understood by those skilled in the art, the present invention allows the monitoring of the performance of an echo canceler within a telephone communications network with embedded apparatus such that additional measuring equipment external to the telephone communications network is not required.

Figure 1:
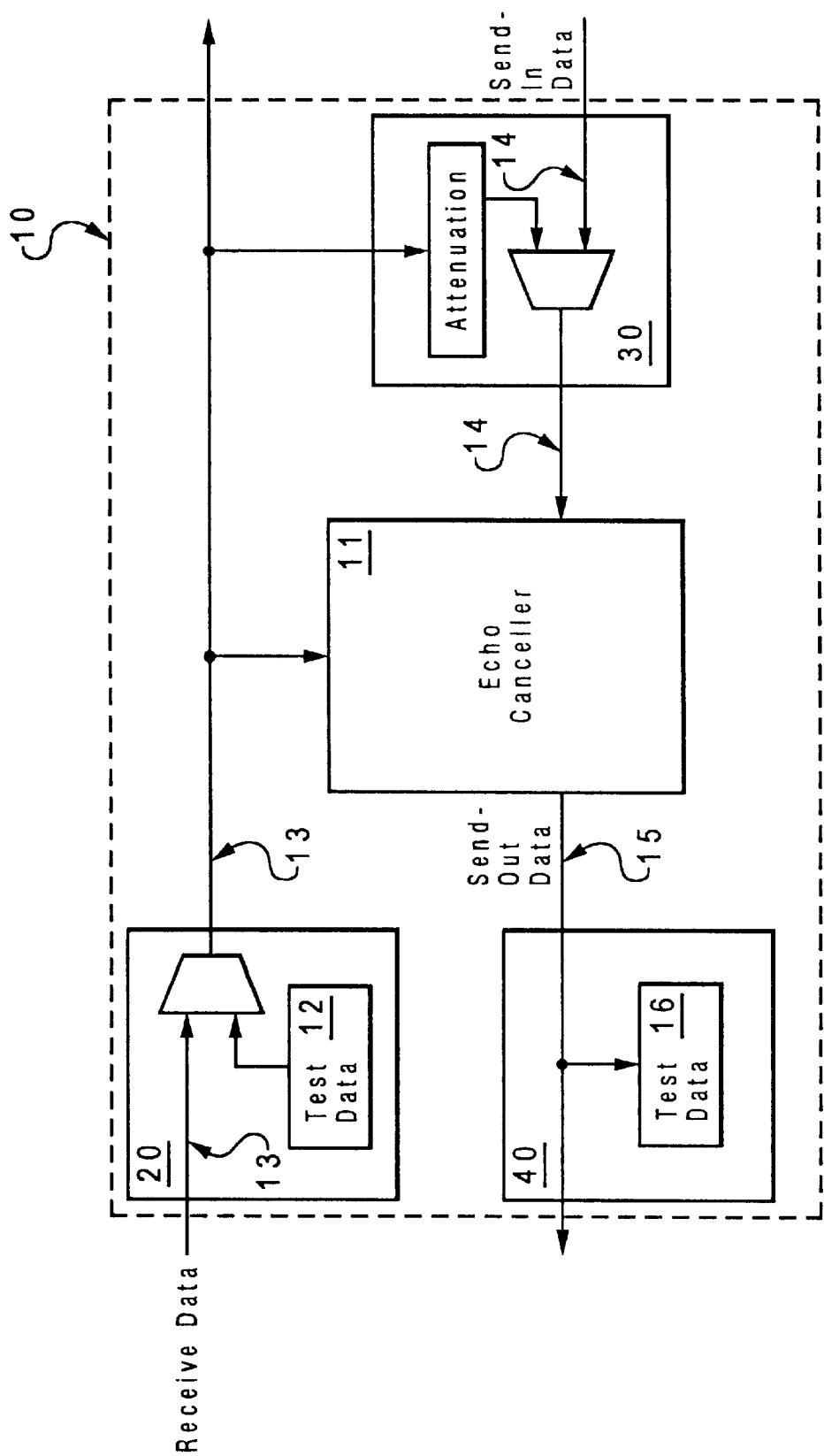
FIG. 1 is a block diagram illustrating an embedded echo-cancellation performance monitoring circuit within a telephone communications network having an echo canceler, in accordance with a preferred embodiment of the present invention.

Referring now to the drawings and, in particular, to FIG. 1, there is a block diagram illustrating an embedded echo-cancellation performance monitoring circuit within a telephone communications network having an echo canceler, in accordance with a preferred embodiment of the present invention. As shown, echo-cancellation performance monitoring circuit 10 comprises three separate units, namely, a test data injection unit 20, an echo path simulator unit 30, and a test data extraction unit 40. Test data injection unit 20 obtains test data 12 from a microprocessor (not shown) and injects test data 12 into receive data of a serial data stream 13 intended for an echo canceler 11.

Echo path simulator unit 30 then takes data from data stream 13 and attenuates the data by a predetermined amount. The data attenuation operation is preferably performed with a read only memory (ROM) located within echo path simulator unit 30. After the attenuation operation, the attenuated data is injected into a send-in serial data stream 14 intended for echo canceler 11.

Finally, test data extraction 40 takes echo-cancelled test data 16 out of a send-out serial data stream 15 and places test data 16 in a parallel register for the microprocessor to read. By utilizing these three separate units 20, 30, and 40 of echo-cancellation performance monitoring circuit 10, the performance of echo canceler 11 can be monitored.

Figure 2:
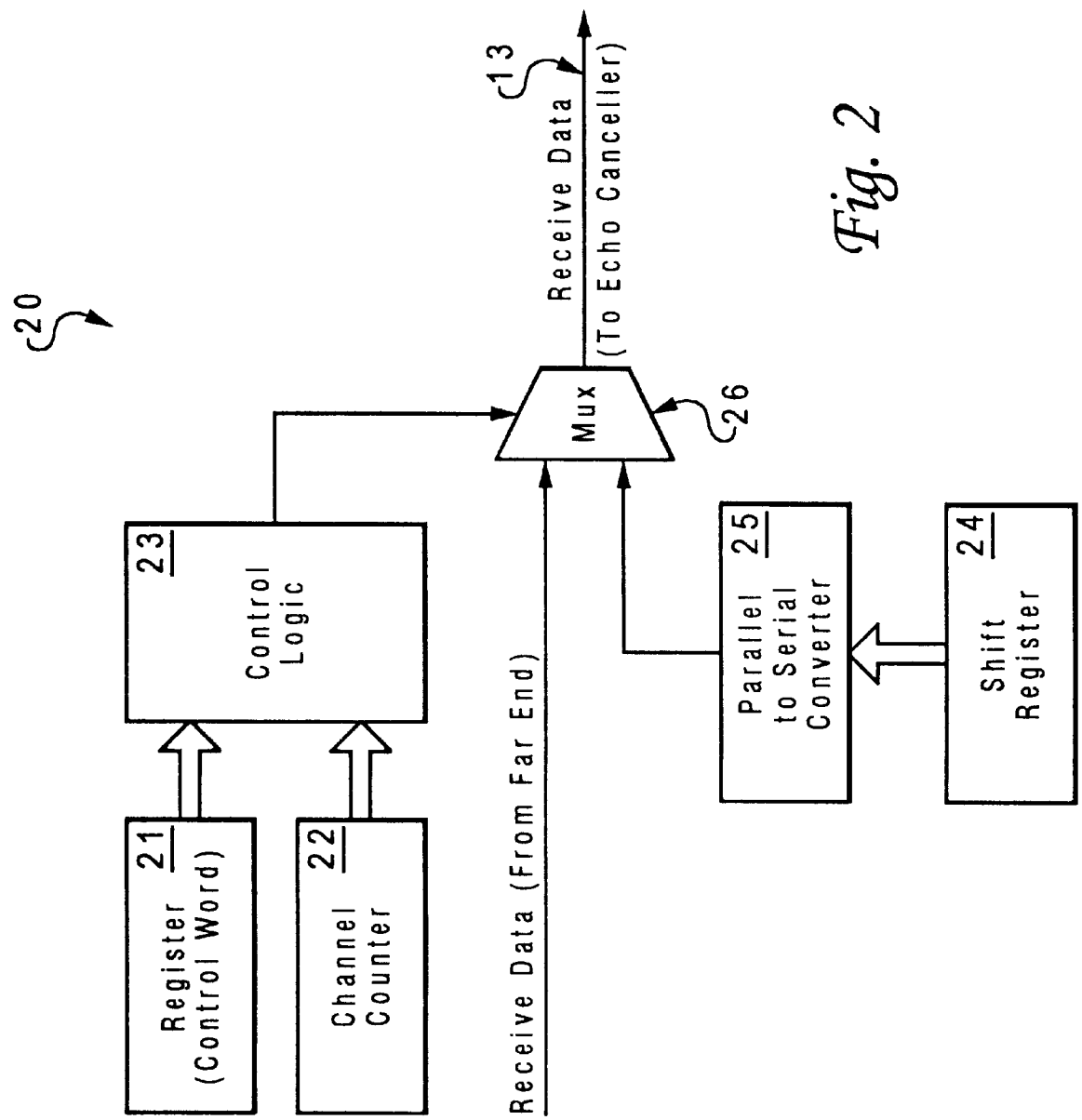
FIG. 2 is a block diagram depicting a test data injection unit of an echo-cancellation performance monitoring circuit, in accordance with a preferred embodiment of the present invention.

With reference now to FIG. 2, there is depicted a block diagram of test data injection unit 20 of the echo-cancellation performance monitoring circuit from FIG. 1, in accordance with a preferred embodiment of the present invention. Test data injection unit 20 injects test data into receive data of serial data stream 13. Data stream 13 is coming from the far end (from the transmitter direction) and is intended for echo canceler 11 of FIG. 1. The test data is generated by the microprocessor. First, test data injection unit 20 receives a control word from the microprocessor and stores the control word in a register 21. This control word is utilized by control logic 23 to specify a timeslot in which the test data should be injected. Next, test data injection unit 20 receives the test data from the microprocessor and stores the test data in a shift register 24. Channel counter 22 is a digital counter running continuously. When the desired timeslot arrives according to channel counter 22, the test data is serially shifted into serial data stream 13 via a parallel-to-serial converter 25 and a multiplexer 26.

Figure 3:
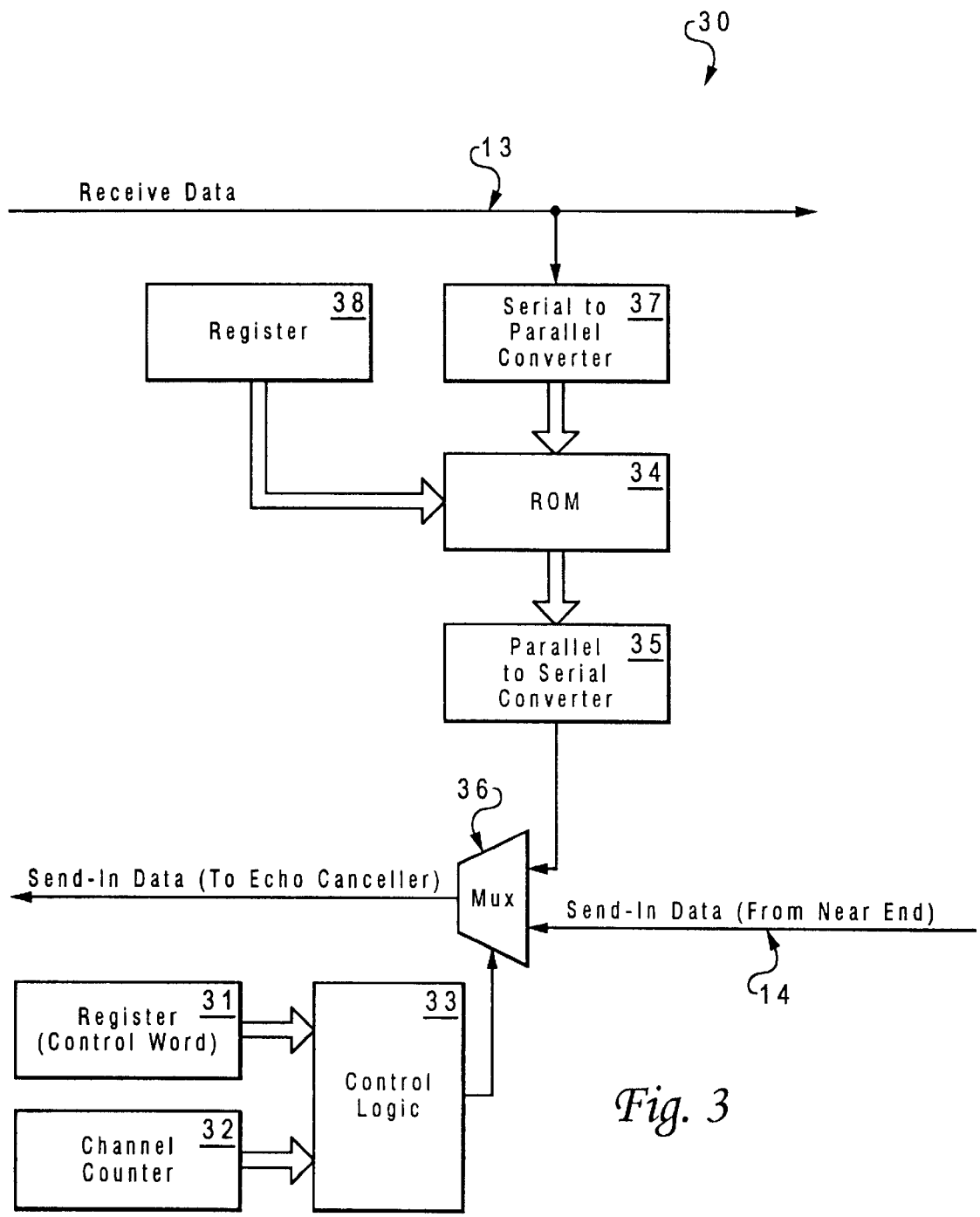
FIG. 3 is a block diagram illustrating an echo path simulator unit of an echo-cancellation performance monitoring circuit, in accordance with a preferred embodiment of the present invention.

Referring now to FIG. 3, there is illustrated a block diagram of an echo path simulator unit 30 of the echo-cancellation performance monitoring circuit from FIG. 1, in accordance with a preferred embodiment of the present invention. Echo path simulator unit 30 simulates an echo path of the telephone communications network by attenuating the test data within serial data stream 13 (from the transmitter) and looping the test data back to a send-in port of echo canceler 11. First, echo path simulator unit 30 receives a control word from the microprocessor and stores the control word in a register 31. Register 31 may be the same register as register 21 of FIG. 2. This control word is utilized by control logic 31 to specify a timeslot in which data is extracted from data stream 13. The logical design of control logic 33 may be the same as control logic 23 of FIG. 2. Next, the extracted data is converted to a parallel mode by a serial-to-parallel converter 37. After the conversion, the extracted data is presented to a read only memory (ROM) 34. As a preferred embodiment of the present invention ROM 34 acts as a lookup table in which multiple attenuation factors are programmed and stored, whereby test data may be attenuated by a programmable amount. The utilization of an appropriate attenuation factor is preferably controlled by an attenuation value stored within register 38. The output of ROM 34 is test data having an appropriate amount of attenuation closely resembled to the telephone communications network in operation. Channel counter 32 is a digital counter running continuously and may be the same counter as channel counter 22 of FIG. 2. When the desired timeslot arrives, according to channel counter 32, the attenuated test data is serially shifted into send-in data of serial data stream 14 from near end (from the receiver) via a parallel-to-serial converter 35 and a multiplexer 36.

Figure 4:
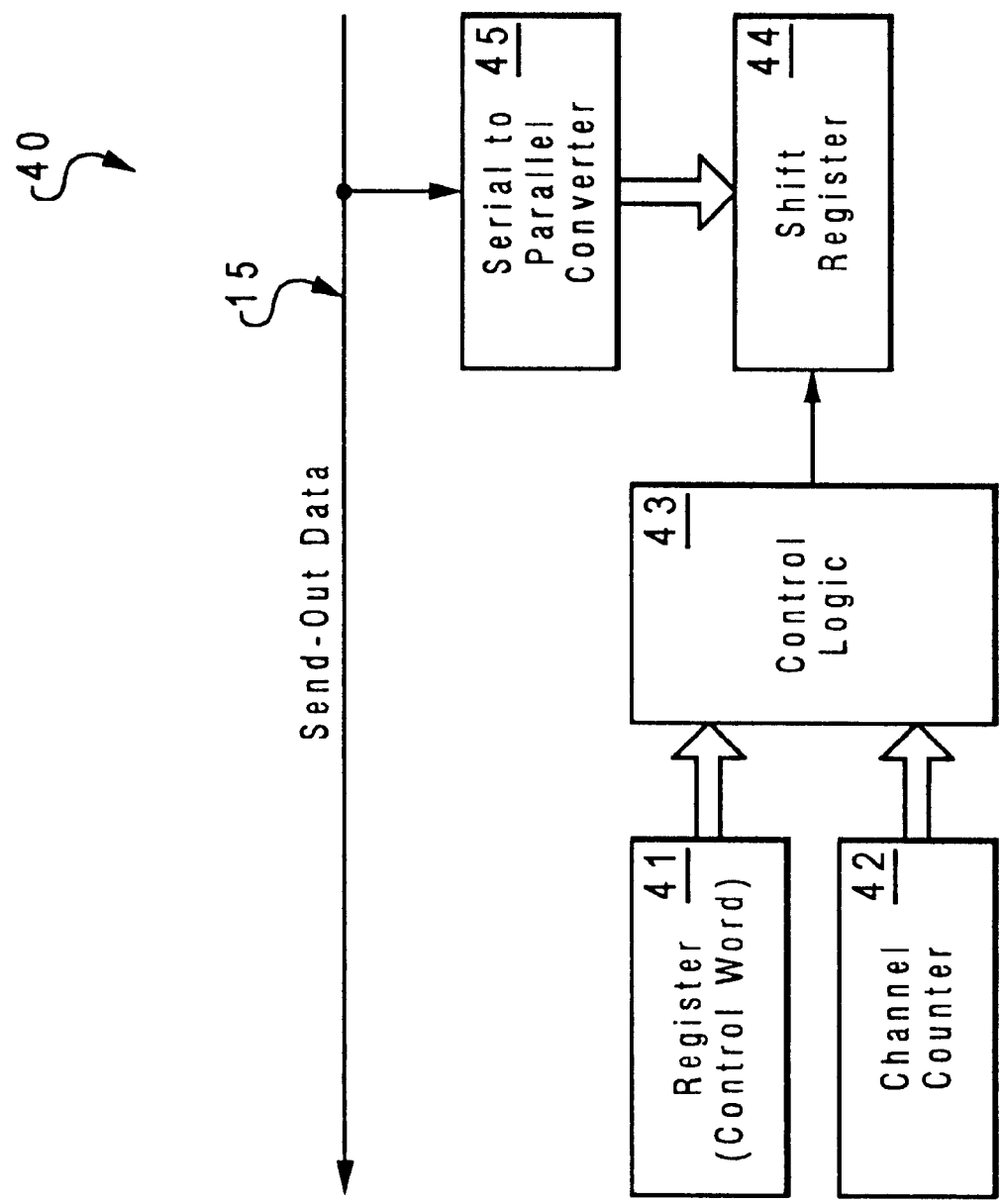
FIG. 4 is a block diagram depicting an echo-cancelled test data extraction unit of an echo-cancellation performance monitoring circuit, in accordance with a preferred embodiment of the present invention.

With reference now to FIG. 4, there is a block diagram depicting a test data extraction unit 40 of the echo-cancellation performance monitoring circuit from FIG. 1, in accordance with a preferred embodiment of the present invention. Test data extraction unit 40 extracts the echo-cancelled test data from send-out data of a serial data stream 15 output from echo canceler 11. First, test-data extraction unit 40 receives a control word from the microprocessor and stores the control word in a register 41. Similar to register 31 of FIG. 3, register 41 may be the same register as register 21 of FIG. 2. This control word is utilized by control logic 43 to specify a timeslot in which shift register 44 is to be loaded with the output from serial-to-parallel converter 45, according to channel counter 42. The logical design of control logic 43 may also be the same as control logic 23 of FIG. 2. Subsequently, the echo-cancelled test data is extracted from data stream 15. After the echo-cancelled test data has been converted to a parallel mode by a serial-to-parallel converter 45, the echo-cancelled test data is then stored in a shift register 44. Finally, the echo-cancelled test data is utilized by the microprocessor to measure the performance of echo canceler 11 within the telephone communications network in operation.

After the echo-cancelled test data has been obtained from an echo canceler, the performance calculation for that specific echo canceler is well-known to those who are skilled in the art of telephone network communications. In essence, the lower the power in echo-cancelled test data in the send-out data stream output from the echo canceler, the better the echo canceler is performing.

As has been described, the present invention provides an improved method and apparatus for measuring the performance of an echo canceler within a telephone communications network. The present invention allows the monitoring of the performance of an echo canceler within a telephone communications network with embedded apparatus such that additional measuring equipment external to the telephone communications network is not required.

While the invention has been particularly shown and described with reference to a preferred embodiment, it will be understood by those skilled in the art that various changes in form and detail may be made therein without departing from the spirit and scope of the invention.

What is claimed is:

1. A circuit for measuring the performance of an echo canceler within a telephone communications network, wherein said circuit is embedded within said telephone communications network, said circuit comprising:

a test data injection unit for injecting test data into a serial data stream intended for said echo canceler during an active call on said telephone communications network, wherein said test data injection unit further includes a multiplexer for serially shifting said test data into said serial data stream according to a predetermined period;

an echo path simulator unit for simulating an echo path by attenuating said test data in said serial data stream and looping said test data in said serial data stream back to said echo canceler during said active call on said telephone communications network; and a test data extraction unit for extracting said test data from a send-out data stream exiting from said echo canceler during said active call on said telephone communications network.

2. The circuit according to claim 1, wherein said test data extraction unit further includes a serial-to-parallel converter and a shift register, wherein said serial-to-parallel converter converts and outputs said extracted test data to said shift register.

3. The circuit according to claim 1, wherein said circuit further includes a processor for measuring the power of said test data extracted from said test data extraction unit.

4. A circuit for measuring the performance of an echo canceler within a telephone communications network, wherein said circuit is embedded within said telephone communications network, said circuit comprising:

a test data injection unit for injecting test data into a serial data stream intended for said echo canceler during an active call on said telephone communications network:

an echo path simulator unit for simulating an echo path by attenuating said test data in said serial data stream and looping said test data in said serial data stream back to said echo canceler during said active call on said telephone communications network, wherein said echo path simulator unit further includes a multiplexer for serially shifting said attenuated test data into said serial data stream according to a predetermined period; and a test data extraction unit for extracting said test data from a send-out data stream exiting from said echo canceler during said active call on said telephone communications network.

5. The circuit according to claim 4, wherein said echo path simulator unit further includes a read-only memory utilized as a lookup table having a plurality of attenuation factors programmed within.

6. A telephone communications network having an embedded apparatus for monitoring the performance of an echo canceler within said telephone communications network, said telephone communications network comprising:

a transmitter for sending a serial data stream;

a receiver for receiving said serial data stream;

an echo canceler embedded within said telephone communications network for cancelling any echo within said serial data stream;

a test data injection unit embedded within said telephone communications network for injecting test data into a serial data stream intended for said echo canceler during an active call on said telephone communications network, wherein said test data injection unit further includes a multiplexer for serially shifting said test data into said serial data stream according to a predetermined period;

an echo path simulator unit embedded within said telephone communications network for simulating an echo path by attenuating said test data in said serial data stream and looping said test data in said serial data stream back to said echo canceler during said active call on said telephone communications network; and a test data extraction unit embedded within said telephone communications network for extracting said test data from a send-out data stream exiting from said echo canceler during said active call on said telephone communications network.

7. The telephone communications network according to claim 6, wherein said test data extraction unit further includes a serial-to-parallel converter and a shift register, wherein said serial-to-parallel converter converts and outputs said extracted test data to said shift register.

8. The telephone communications network according to claim 6, wherein said circuit further includes a processor for measuring the power of said test data extracted from said test data extraction unit.

9. A telephone communications network having an embedded apparatus for monitoring the performance of an echo canceler within said telephone communications network, said telephone communications network comprising:

a transmitter for sending a serial data stream;

a receiver for receiving said serial data stream;

an echo canceler embedded within said telephone communications network for cancelling any echo within said serial data stream;

a test data injection unit embedded within said telephone communications network for injecting test data into a serial data stream intended for said echo canceler during an active call on said telephone communications network, an echo path simulator unit embedded within said telephone communications network for simulating an echo path by attenuating said test data in said serial data stream and looping said test data in said serial data stream back to said echo canceler during said active call on said telephone communications network, wherein said echo path simulator unit further includes a multiplexer for serially shifting said attenuated test data into said serial data stream according to a predetermined period; and a test data extraction unit embedded within said telephone communications network for extracting said test data from a send-out data stream exiting from said echo canceler during said active call on said telephone communications network.

10. The telephone communications network according to claim 9, wherein said echo path simulator unit further includes a read-only memory utilized as a lookup table having a plurality of attenuation factors programmed within.

* * * * *